United States Patent [19]

Moyer et al.

[11] 3,822,363

[45] July 2, 1974

[54] PORTABLE COMPUTER TERMINAL USING A STANDARD TELEVISION RECEIVER

[75] Inventors: Ronald G. Moyer, Warminster; Thomas M. Emory, Jr., Newton, both of Pa.

[73] Assignee: Digi-Log Systems, Inc., Willow Grove, Pa.

[22] Filed: Aug. 9, 1972

[21] Appl. No.: 279,227

[52] U.S. Cl. ..... 179/2 TV, 179/2 DP, 340/324 AD, 340/152 R

[51] Int. Cl. .......................................... H04m 11/06

[58] Field of Search ........... 179/2 TV, 2 DP, 15 FD; 340/324 AD, 152 R; 178/6.8, DIG. 13; 325/105, 101; 332/60, 61, 31 R, 31 T, 53, 308

[56] References Cited

UNITED STATES PATENTS

| | | | |
|---|---|---|---|
| 2,648,272 | 3/1972 | Schroder | 340/324 AD |
| 3,017,625 | 1/1962 | Evans | 340/324 A |
| 3,242,470 | 3/1966 | Hagel Barger | 340/324 |
| 3,457,368 | 7/1969 | Houche | 178/17 R |
| 3,457,371 | 7/1969 | Sharon | 179/2 DP |
| 3,573,787 | 4/1971 | Sandgren | 340/324 AD |
| 3,597,692 | 8/1971 | Fanndy | 178/DIG. 13 |
| 3,641,555 | 2/1972 | Griffin | 179/2 DP |
| 3,659,283 | 4/1972 | Ophir | 340/324 AD |
| 3,659,285 | 4/1972 | Baer | 340/324 AD |
| 3,665,408 | 5/1972 | Erdahl | 340/324 A |
| 3,685,039 | 8/1972 | Flanagan | 340/324 AD |
| 3,701,988 | 10/1972 | Houterman | 340/324 AD |
| 3,706,905 | 12/1972 | Alexander | 340/324 A |

*Primary Examiner*—Kathleen H. Claffy
*Assistant Examiner*—Thomas D. Amico

[57] ABSTRACT

A keyboard terminal for communicating with a remote computer via telephone lines uses an acoustic coupler between the keyboard and the lines. A visual display of the data communication is presented on the screen of an ordinary TV receiver by simply connecting the keyboard unit to the external antenna leads of the TV receiver.

8 Claims, 5 Drawing Figures

PORTABLE COMPUTER TERMINAL USING A STANDARD TELEVISION RECEIVER

FIELD OF THE INVENTION

The present invention relates to peripheral computer terminals, and more particularly to a computer terminal which uses, without modification, an ordinary TV receiver as a display.

BACKGROUND OF THE INVENTION

In the past, the most prevalent means of effecting communication between a terminal station and a remote computer was to use a teletypewriter. This device is a mechanical terminal which includes a standard keyboard that mechanically generates electronic codes for each of the keys. The codes are transmitted through phone lines to the romote computer for processing and response return to the terminal station. When a response is received from the computer, the received binary code is translated by the teletypewriter to a character that is typed on a hard copy, usually paper.

Although this device has proven to be satisfactory in the past, the latest state of the art renders the teletypewriter obsolete in most instances where a hard copy is not required.

The major disadvantages of the typewriter are twofold. First, due to the mechanical nature of the machine, a great deal of ambient noise is generated. This is difficult to live with in an environment where employees or operators are exposed to the noise for any length of time.

The second major problem with the teletypewriter is the slow data rate that it can operate. Due to the mechanical nature of the machine, it is only capable of communicating at 10 characters per second. At this rate, the phone lines are under-utilized. This is due to the fact that phone lines are capable of transmission at a rate of at least 30 characters per second.

Due to the large size and power requirements of the teletypewriter, it is not portable. Thus, this machine presents physical utilization difficulties in a large number of applications.

In recent years, a new generation of computer terminal has developed. Basically, these terminals include a keyboard with solid state circuitry for converting key actuation to binary code that is adaptable to communication over telephone lines to a remote computer. After a computer has been queried, it can respond over the same telephone lines to the computer terminal which is capable of displaying the two-way communication on a cathode ray monitor. The keyboard is coupled to the phone lines by an acoustic coupler which transmits tones representing the characters of the transmitted data. When receiving, the acoustic coupler translates received tones to the equivalent characters that may be displayed on the monitor.

This type of system offers the used advantages that can not be realized with the teletypewriter. Initially, the mechanical noise that is characteristic of the teletypewriter is eliminated. Next, because the keyboard terminal is primarily electronic in nature, the unit has tremendous reliability and can operate at a faster speed. Thus, the keyboard can communicate with the computer at the maximum rate of transmission which the telephone lines can accept.

Although the newer type of computer terminal offers great advantages over the teletypewriter, there are several drawbacks when compared to the present invention.

Initially, the prior art terminals require a separate cathode ray tube monitor which is relatively expensive. Next, these terminals are available in several parts which require interconnection. Thus, the keyboard may be separate from the acoustic coupler. In addition, a relatively heavy CRT monitor must be wired into the keyboard so that a visual display can be presented. Consequently, the terminal loses its maneuverability and its portability as a single unit. Also, the requirement of a CRT monitor necessitates an additional expense for the user.

BRIEF DESCRIPTION OF THE INVENTION

The present invention is an improvement over currently available computer terminals of the type just described. The major improvement resides in circuitry which allows the keyboard to generate electrical signals on connector leads that are simply attached to the external antenna terminals of an ordinary TV receiver. Accordingly, the user can realize significant monetary savings if he already has a standard TV receiver available. If not, he may purchase a small portable TV which is relatively inexpensive when compared to an industrial CRT monitor which prior art systems require.

Further, the present invention includes the keyboard and acoustic coupler in one, lightweight portable package which can be easily moved from place to place.

The above-mentioned objects and advantages of the present invention will be more clearly understood when considered in conjunction with the accompanying drawings, in which:

DETAILED DESCRIPTION OF THE INVENTION

Figures 2, 3, 4:
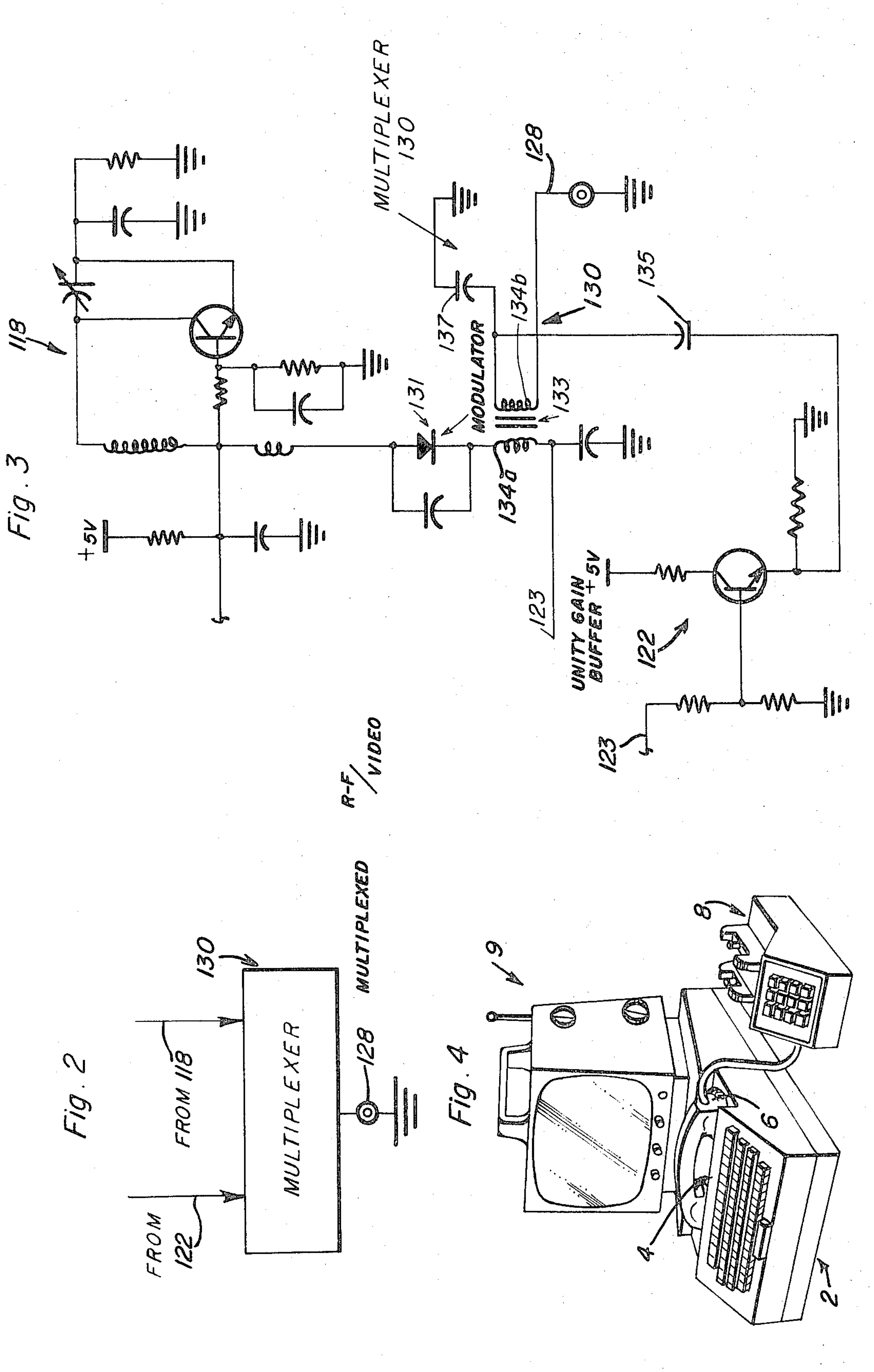
FIG. 2 is a block diagram of a mixer which provides a dual output in the form of an R-F and video signal for utilization by either a standard TV receiver or an industrial CRT monitor.
FIG. 3 is an electrical schematic diagram illustrating the particular circuitry of the mixer that was shown in block diagram in the previous figure.
FIG. 4 is a perspective view illustrating the external appearance of the present computer terminal when used in conjunction with a small ordinary TV receiver and a conventional telephone.

Referring to the figures, and more particularly FIG. 4 thereof, reference numeral 2 generally describes the computer terminal package that has a keyboard. By depressing the keys, code tones are generated and made available at an acoustic coupler 4 which is intergrally located in the terminal 2. A telephone receiver 6 is placed upon the acoustic coupler to allow communication between the terminal 2 and a standard telephone 8. The code is transmitted to a remote computer (not shown) through telephone lines and a response is routed back to the telephone 8. From there, the response is made manifest by tones at the earpiece of the receiver 6. The acoustic coupler picks up the tones and transmits these tones to the terminal 2 where electronic circuitry decodes the tones and presents a visual display on the screen of an ordinary TV receiver 9. Means are provided on the keyboard 2 for presenting a display of the characters typed while the terminal is transmitting to the computer.

Figure 1A:
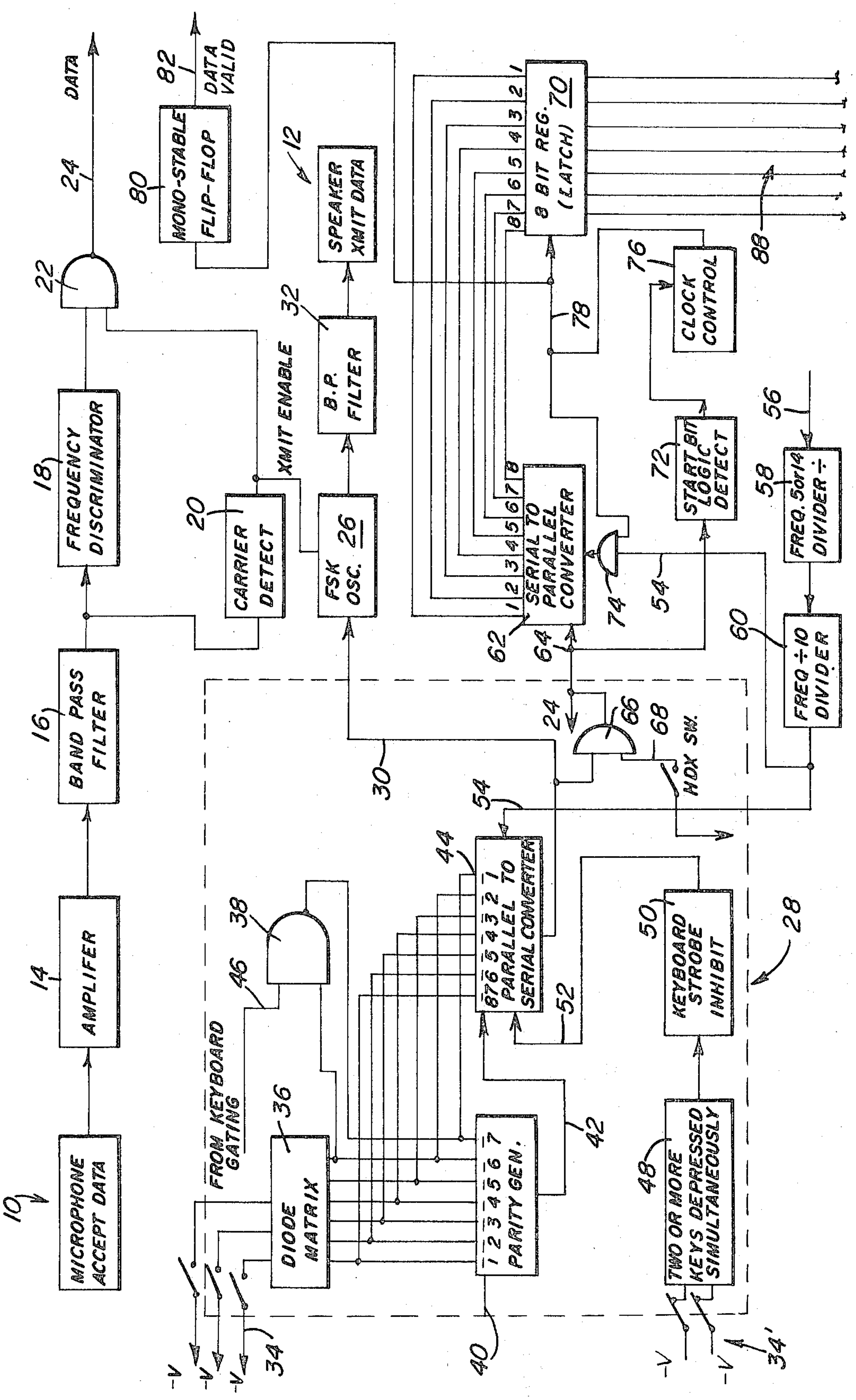
FIGS. 1A and 1B are electrical block diagrams of the computer keyboard terminal, including an acoustic coupler for allowing transmission of data between the keyboard electronics and telephone lines.

Referring to FIG. 4, the acoustic coupler 4 is seen to have the external appearance of a telephone receiver cradle for snuggly receiving the ends of the telephone receiver 6. With reference now to FIG. 1A, the cradle has a first end with a microphone therein as indicated by reference numeral 10. The microphone accepts data from the earpiece end of the receiver 6 (FIG. 4). This data is transmitted to the phone 8 (FIG. 4) by a remote computer, via telephone lines.

In order for the keyboard terminal 2 to transmit data to the computer, FIG. 1A illustrates a speaker 12 for transmitting data, as generated by the keyboard. The speaker 12 is located in an opposite end of the cradle 4 (FIG. 4) and is acoustically coupled to the mouthpiece end of the telephone receiver 6 (FIG. 4). Thus, data being generated on the keyboard of the terminal may be sent to the remote computer through telephone 8 (FIG. 4) after the keyboard depressions have been translated to audio tones.

The communication system deployed in the present invention is a full duplex system that uses two frequency shift key (fsk) channels in a standard Bell 103 configuration.

The microphone 10 has an output that is delivered to the input of amplifier 14 for boosting signal strength. The output of amplifier 14 is fed to a band pass filter 16 where transients and noise are filtered from the signal received from the computer. This signal is then further processed by a frequency discriminator 18 that functions to detect the presence of frequencies corresponding to a binary 1 and binary 0. The frequency discriminator 18 may be characterized as a double tuned linear frequency discriminator as used in FM discriminators. As an alternative, the frequency discrimination could be implemented by using a phase locked loop. At the junction between the band pass filter 16 and the frequency discriminator 18 is a carrier detector 20 that responds to the carrier present when data is being transmitted from the computer. Basically, the carrier detector 20 is a threshold voltage detector which is conventional. The output of the detector 20 is fed to an AND gate 22 at a first input thereof. A second input of the AND gate 22 is connected to the frequency discriminator 18. Thus, when a proper frequency is detected along with the presence of a data carrier, the AND gate 22 is enabled and data flows through the gate at output line 24.

The following discussion will pertain to the circuitry required to transmit data generated on the keyboard of the terminal.

A frequency shift key (FSK) oscillator oscillates at two distinct frequencies depending upon whether a binary 1 or a binary 0 is selected. The oscillator is a programmable unijunction oscillator of conventional design. Once enabled, the oscillator will provide one or the other frequency to a band pass filter 32 that reduces unwanted harmonics. The output of the filter is connected to the speaker 12 of the acoustic coupler. The speakr developes the acoustic signal representing the character depressed on the terminal keyboard, this signal then being transmitted to the remote computer through the telephone lines.

The following discussion is offered to explain the generation of character codes when keys on the keyboard are depressed.

In FIG. 1A, reference numeral 28 generally indicates the circuitry, in block diagram form of the keyboard.

The binary bits of a keyboard character are generated along lead 30. The coded characters conform to the ASC II standard code. The bits appear on lead 30 in serial fashion. Lead 30 is connected to an input of the FSK oscillator 26, perviously discussed. As mentioned earlier, this oscillator generates two frequencies depending upon whether the input on lead 30 is a logic 1 or logic 0.

The binary code for each character is originally generated by the closure of any one or combinations of 52 keyboard switches 34. A conventional type diode matrix 36 has its inputs connected to the key switches. The output of the matrix appears as six code bits or six levels of the ASC II code. The seventh bit is generated by gate 38 which has two inputs. The first input is the sixth bit of the diode matrix output. The second input to the gate 38 comes from keyboard gating, along lead 46. The keyboard gating lead is energized when certain keys on the keyboard are depressed. For example, the standard ASC II code contains a character set of upper case letters. When certain keys are shifted, a character, such as a bracket will be generated by the diode matrix 36. When such a character is generated, the lead 46 is energized and allows the gated seventh bit to be fed to a parity generator 40, along with the six code bits from the diode matrix 36. The parity generator is characterized by a standard IC chip and generates an odd or even parity bit which is selectable and which becomes an eighth bit transmitted to the parallel to serial convertor 44. This convertor also receives the previously discussed seven bits that appear at the input of the parity generator. The output of the parallel to serial converter 44 appears at the lead 30 which as discussed before, carries the serial ASC II code to the FSK oscillator 26.

In order to avoid the erroneous generation of a code upon the depression of two or more keys simultaneously, the keyboard circuitry includes a detector 48 having switches 34' connected to the input thereof. The switches are mechanically coupled with the keyboard key switches 34. The detector 48 sums currents from the switches 34', and when a threshold is exceeded, the circuit determines that two or more keys have been depressed and as a result, the detector 48 issues a signal to the keyboard strobe inhibit gate 50. This gate transmits an inhibit pulse along lead 52 to the parallel to serial converter 44. When the inhibit gate generates a signal, the parallel to serial converter is prevented from loading which prevents additional flow of information along lead 30.

The parallel to serial converter 44 has an additional input from line 54 which carries a keyboard clock signal that determines keyboard data flow rate. The clock pulses appearing along lead 54 are originally generated from horizontal sync pulses at 56. The sync pulses are produced at an internal fixed oscillator, to be discussed in greater detail hereinafter. The horizontal sync pulses at 56 undergo a frequency division of five or 14 depending upon whether communication over the telephone lines is occuring at the standard 10 or 30 characters per second, respectively. The frequency divider 58 is fabricated in the form of an IC chip which is widely available. The output from this frequency divider is transmitted to the input of a further divider 60, which is also a conventional IC chip for causing further frequency division by a factor of 10. The output from the frequency divider 60 forms the keyboard clock on lead 54.

The circuitry illustrated in FIG. 1A is capable of operating in either half duplex or full duplex. In full duplex, there is displayed, only the data received from the computer. In this mode of operation, actuation of the keyboard will not cause a direct display. Thus, in this mode, when keys are depressed there is character transmission via the coupler to the remote computer only. The computer will echo back the characters for receipt by the coupler and subsequent display. This serves as a means for checking what the operator is typing on the keyboard.

In the half duplex mode, there is a direct display from the keyboard. Thus, there is no echo back from the computer and as a result, there is no complete assurance that the computer has received what has been typed at the keyboard.

The serial to parallel converter 62 receives data from either the computer signal as generated on line 24 of the coupler, or from lead 30 which carries the serial ASC II character codes as generated by key depression.

When data is being received from the computer it is directly connected to the serial to parallel converter. However, the data from the keyboard lead 30 is gated through the gate 66. The gate is enabled when the half duplex switch (HDX) is closed which causes signal transmission along lead 68 to turn on gate 66.

Once received data undergoes serial to parallel conversion at 62, the eight bit character is loaded into an eight bit register 70 which stores one word at a time. Before the word stored in register 70 is shifted out of the register, there must be a detection of a start bit in a data word at bit detector 72. The bit detector 72 has an input connected to the converter input lead 64. The output from the start of data word detector 72 is fed to the clock control 76 which controls the timing for shifting data out of the eight bit register 70. The start bit of a data word is part of the standard ASC II character code developed by the parallel to serial converter 44.

A gate 74 is provided at an input to the serial to parallel converter 62. The gate has an input that is coupled to the keyboard clock line 54. The purpose of the gate 74 is to strobe the data line at the midpoint of each data bit. This insures proper transmission of each character between the serial to parallel converter 62 and the eight bit register 70.

The detection of the start bit is also important when data is being received from the computer. This detection is done by detector 72. The detector is basically a counter which counts the time interval between the leading edge of the start bit and the midpoint. If the time interval exceeds a preselected value, the start bit is assumed to be valid. However, if the time interval is not exceeded, the start bit is assumed to be invalid and may be a transient or the like. A detector 72 is of conventional design and is employed in a wide variety of data communication systems operating with an asynchronous serial transmission system. The start bit is also detected when it is loaded in the serial to parallel converter 62. Thus, when the start bit that is originally loaded in the serial to parallel converter becomes detected, it is known that a complete word has been transmitted to the converter. When the start bit of a data word is detected at the input of converter 62, line 78 is actuated and causes an inhibit of further strobing of the converter 62 through gate 74. The register 70 is then switched to receive the word from the converter 62.

At the same time register 70 receives the word, a monostable filp-flop 80 is triggered due to the presence of an enabling pulse on line 78. The flip-flop generates a signal at the output 82 which corresponds to a valid data pulse for loading of the display driver, to be discussed hereinafter. Presence of a pulse on line 82 indicates to the rest of the circuitry that the word has been completely loaded.

Figure 1B:
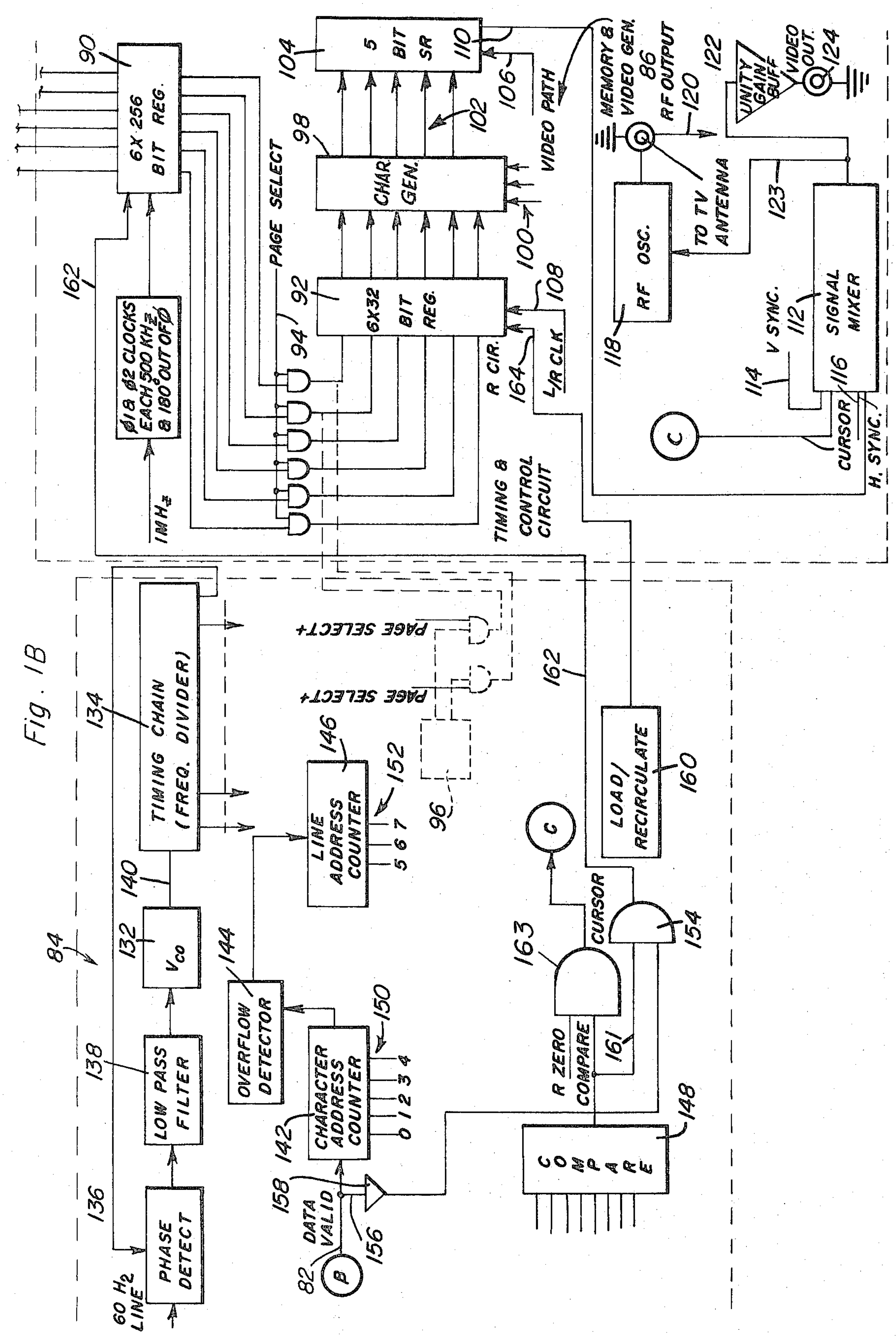

The circuitry for converting electrical binary signals to a video display is concentrated between two circuits. The first circuit achieves timing and control and is generally indicated in FIG. 1B by reference numeral 84. This timing and control circuit is coupled to a memory and video generator generally indicated at reference numeral 86.

As previously discussed, the eight bit register 70 stores a single word at a time. Each word is represented by a six bit code appearing at output lines 88. These lines input to 6 × 256 bit register in the form of a recirculating MOS memory. Such a memory is commercially available and is identified in the market place as INTEL 1402. The capacity of the memory is chosen so that eight lines of 32 characters per line can be stored. Each character itself is comprised of six bits. The capacity of the memory constitutes a full "page" in the display format. Data is fed to a line register 92, a line at a time. In order to store a line at a time, the capacity of the register 92 is set at 6 × 32 bits. A line register such as 92 is commercially available and is identified as TMS 3112. Actually, the data fed between the bit register 90 and the bit register 92 must flow through the intermediate gates having a page select enabling input 94. Thus, for a particular "page" of data, all the illustrated gates are enabled in parallel. In order to generate a different page of data, a second bit register such as 90 is employed as a memory for this second page of data. The second memory unit is indicated in phantom by reference numeral 96. As will be seen from the figure, the memory 96 has its own ouput leads that are gated to the line register 92 through a second set of parallel gates. The enabling signal "page select" is different for the gates at the output of register 90 than it is for the gates appearing at the output of the register 96. Any number of "pages" can be generated as long as each "page" has its own memory such as 90, 96 and the associated page select gates.

Characters from the line register 92 are presented in sequence to the character generator 98. The character generator communicates with the line register 92 via six bit lines that define the sequentially delivered characters. The character generator 98 is identified by its commercial notation TMS 2501.

The video display is constructed row by row until eight rows are displayed on the screen. Each row contains a maximum of 32 characters. As far as the actual character construction of the video data, each character is constructed from a 5 × 7 dot matrix. As will be seen in FIG. 1B, three input lines generally shown at 100 provide timing signals for display row selection. More particularly, the three lines allow the generation of binary values from binary 0 to binary 7.

The output from the character generator 98 is transmitted to a five bit parallel to serial converter 104 via connecting lines 102. A clock input at 106 determines the bit rate of dots in the character matrix. Returning to the line register 92, a load/recirculate clock 108 is presented thereat to determine the flow of characters sequentially transferred from the output of register 92. The origin of the clock signal 108 will be discussed hereinafter.

Video data from the five bit parallel to serial converter 104 is transmitted on line 110 to a signal mixer 112 where this signal is superimposed with a vertical synchronizing pulse 114; a horizontal synchronizing signal 116; and a third input to the mixer which is a cursor signal. The horizontal and vertical synchronizing signals 114 and 116 serve as framing signals. The cursor is a symbol, such as an elevated hyphen which appears on the display as a next character position to be displayed. The cursor is of great value to a machine operator inasmuch as it informs the operator when line feed is required. The output from the signal mixer is fed to an RF modulator 118 through connecting lead 123. The oscillator/modulator 118 shifts the frequency of the mixed signal to the RF range and makes the signal available at the RF output terminal 120.

By employing the RF oscillator 118, it is possible to generate composite video information from the individual signals appearing at the input of the signal mixer and transferring them to the antenna terminals of an ordinary TV for display on its screen. This is a primary accomplishment of the invention over the prior art. It is to be emphasized that the composite display can be transmitted to an ordinary TV receiver without making connection to, or modifications of the internal circuitry of the receiver. Rather, a simple connection between the terminal 120 and the external terminals of a conventional TV receiver is all that is required.

If a computer terminal user wishes to have the present terminal display on a commercial CRT monitor instead of a conventional TV receiver, the RF oscillator 118 and its output jack 120 are eliminated. Instead, the output from the signal mixer 112 is fed to a unity gain buffer 122 which operates upon the composite video from the mixer and provides signal level conversion. The buffer 122 is an emitter follower driver that presents a low impendance output to a CRT monitor at the video output jack 124.

In view of the desirability for allowing a rapid connection to either an ordinary TV receiver or an industrial CRT monitor, it would be desirable to provide a single signal jack where the RF signal and the video are multiplexed. Thus, if the antenna terminals were connected to this multiplex output jack, the TV would process the RF signal and produce an appropriate display on the TV screen. On the other hand, if a user wished to connect an industrial CRT monitor, the same multiplex output jack could be used, in which event the monitor would only see the video information.

With the desirability of this multiplex mode, an additional circuit is provided as shown in FIG. 2. The jack where the multiplexed RF/video signals are presented is indicated by reference numeral 128. This output is generated by a multiplexer 130 that is different from the previously discussed mixer 112. The previously discussed signal mixer 112 is still used to generate composite video. In effect, the multiplexer 130 of FIG. 2 allows the permanent installation of both an RF oscillator 118 and a unity gain buffer 122 as opposed to restricting the utilization of either one or the other. FIG. 2 indicates that the mixer 130 receives one input from the unity gain buffer 122 and a second input from the RF oscillator 118.

The multiplex circuitry is shown in greater detail in FIG. 3. The RF oscillator 118 is seen to include a conventional single transistor oscillator circuit with a diode modulator 131 connected to the base components of the transistor stage. The modulator is more particularly comprised of parallel connected diode and capacitor components.

The video signal from the output lead 123 of signal mixer 112, is introduced to the modulator 131 through the primary 134*a* of the transformer 133. The modulator 131 performs a multiplication or modulation of the oscillator Rf output by the lower frequency video signal. The modulated signal is coupled by transformer action to the secondary 134*b* of transformer 133. The unity gain buffer 122 again introduces the video signal, this time through the coupling capacitor 135, which is connected to the secondary 134*b*. A by-pass capacitor 137 is connected between ground and the junction point connecting one end of the secondary 134*b* and the coupling capacitor 135. The result is the algebraic addition of the RF modulated signal and the lower frequency video signal which now becomes available at jack 128.

Reference is made once again to FIG. 1B wherein the timing and control circuitry 84 will be discussed in detail. Basically, this circuitry generates horizontal sync and vertical sync signals; shifts out data from the five bit parallel to serial converter 104; controls the recirculating and loading of memories 90 and 92; and provides a reference frequency for the communication clock generator 58 (FIG. 1A). In terms of the circuitry employed for timing and control, a phase lock loop is used for master timing.

The phase lock loop consists of a timing chain generator 134, a phase detector 136, a low pass filter 138, and a voltage controlled oscillator 132.

The timing chain generator 134 is a 16 stage binary counter that generates 16 bits. The right-most bit line represnets the lowest generated frequency from the counter 134. This lead is fed back to a phase detector 136 where phase angle comparison is made with a standard frequency, such as a 60 HZ line. The detector is of the conventional demodulator type capable of generating an error voltage output that is fed to a low pass filter 138 which includes a charging capacitor. The charging capacitor provides the input to the voltage control oscillator 132. This oscillator generates a frequency in accordance with the input presented to it, this input being proportional to the difference in phase between the reference voltage and the fed back voltage present at the phase detector. In turn, the output from the oscillator 132 provides a stable frequency reference to the timing chain generator through connecting lead 140.

A character address counter 142 receives an input from the data valid line 82 (FIG. 1A) each time a character is transmitted or received. The output from this counter constitutes five bits indicated by reference numeral 150. Another output from the counter 142 feeds an overflow detector 144 which turns on when a particular line has been filled with characters. The overflow detector 144 then communicates with an input to the line address counter 146 to accomplish line incrementing. The line address counter 146 has a three bit output as indicated by reference numeral 152. When the terminal is operating in a typewriter mode of entry, counting of the characters entered is required so that line spillover does not occur.

A comparator 148 compares the bits generates by the character address counter 142, the line address counter 146 with eight bits from the timing chain generator 134. The function of this comparison is to compare the address of a particular character on a particular line with the address of the main memory 90. The address of this particular character at a particular line is generated by the eight bits from 150 and 152 from the counters 142 and 146. When a comparison exists a COMPARE signal is generated by the comparator 148. This determines that a character loaded at a particular location in memory 90 will be displayed at a corresponding location on the screen of a TV display. The COMPARE signal is a first input 161 to the gate 154. The second input to gate 154 is a DATA VALID pulse 156 that is inverted by 158. When a character is received from the keyboard or coupler, and a COMPARE signal exists, a pulse is generated on line 162 which switches the memory 90 from a normally recirculating mode to a load mode for loading memory 90 with characters as they are transmitted or received, memory 90 has locations corresponding to each character position on a screen.

An additional timing control is provided by the LOAD/RECIRCULATE unit 160 which is driven and synchronized to timing chain 134 and which causes shifting of memory 92 between load and recirculate modes. When in a load mode, data is transferred between memories 90 and 92. Shifting occurs between modes once for each character row because the characters are dumped by 90 and loaded into 92 on a character line by line basis for every 16 traces the raster scan under control of RCIR signal on on line 164. The RCIR signal on line 164 is a timing control signal for the register memory 92. The L/R clock on line 108 is synchronized with the timing chain 134 and produces high frequency clock signals to clock the character rate from register memory 92.

The cursor is a trace that increments from one screen position to the next indicating where the next character will be displayed. The cursor trace is developed as a horizontal scan line on the eighth trace line of each trace set associated with the previously mentioned 5 × 7 dot matrix defining each character. The generation of a cursor as a trace on a line below the 5 × 7 dot matrix trace set has been done before. It is implemented by providing an input to gate 163 that signals the occurence of the eighth trace of a dot matrix trace set. The signal at this first input is denoted R ZERO to denote row zero of a trace set. It should be mentioned that a cursor could be generated as a horizontal trace above the 5 × 7 dot matrix of each character. The R ZERO signal is generated when the lines 100, driving character generator 98, are at a binary zero state. The second input to the gate 163 is a compare signal from the comparator 148. When coincidence of these signals occur, a cursor signal is generated from the gate output which is fed into the signal mixer 112 as shown in FIG. 1B. When mixed with the remaining components of the composite signal generated by the mixer 112, the cursor will appear on the screen.

Thus described, the present invention offers the computer terminal user great advantages over prior art devices.

It should be understood that the invention is not limited to the exact details of construction shown and described herein for obvious modifications will occur to person skilled in the art.

Wherefor the following is claimed by us:

1. A data terminal for displaying lines of transmitted or received data characters on the screen of a conventional TV, the terminal comprising:

first memory means for storing data characters equal in number to the character capacity of the screen;

second memory means having its input connected to the first memory means for receiving one data line, at a time, from the first memory means;

character generator means having its input connected to the output of the second memory means for converting each character of data in a line to a dot matrix representative of the character;

means connecting the output of the character generator means to a signal mixer for generating a composite video data signal including horizontal and vertical synchronizing components which are introduced to the mixer;

R.F. oscillator means connected to the output of the mixer for translating the frequency of the video signal to the R.F. region;

means for connecting the translated video signal to the antenna of a conventional TV;

the terminal further including control circuitry comprising:

timing chain means connected in circuit with a phase lock loop for counting in a frequency stablized manner;

means for generating a signal when a valid data character has been transmitted or received by the terminal;

character address counter means connected to the signal generating means for incrementing its count in response to generated data valid signals;

line address counter means having its input connected in circuit with the character address counter means for incrementing its count in response to the filling up of a data line with processed characters;

means for connecting the outputs of the character and line address counter means to form a combined count;

means for comparing the combined count with a count from the timing chain means and producing a comparison signal when an identity of counts exists therebetween;

gate means for detecting coicidence between a comparison signal and a data valid signal;

means connecting the output of the gate means to the first memory means for changing the mode of operation of the first memory means from recirculating to loading of data characters;

load-recirculate means driven by the timing chain means and having an output connected to the second memory means for changing the mode of operation of the second memory means from recirculating to the loading thereof of a line of data characters from the first memory means;

a high frequency clock line connected between the timing chain and the second memory means for reading out the characters stored therein to the character generating means; and means connected between the timing chain means and the character generator means for sequentially producing display trace signals for each row of the dot matrix of a character being fed to the character generator means by the second memory means.

2. A data terminal for displaying lines of transmitted or received data characters on either screen of a conventional TV or the screen of a cathode ray tube monitor, the terminal comprising:

first memory means for storing data characters equal in number to the character capacity of the screen;

second memory means having its input connected to the first memory means for receiving one data line, at a time, from the first memory means;

character generator means having its input connected to the output of the second memory means for converting each character;

means connecting the output of the character generator means to a signal mixer for generating a composite video data signal including horizontal and vertical synchronizing components which are introduced to the mixer;

R.F. oscillator means;

modulator means connecting the oscillator output and the video data signal to form a modulated R.F. signal;

means connected to the output of the modulator means for algebraically adding the video data signal to the modulated signal to form a multiplex signal;

and connector means for communicating the multiplex signal to either the antenna leads of a conventional TV or the input terminal of a CRT monitor so that either will display the data contained in the video display signal.

3. The subject matter of claim 2 wherein the modulator means comprises parallel connected diode and capacitor components connected to the output of the R.F. oscillator means.

4. The subject matter of claim 2 wherein the means for algebraically adding the video data signal to the modulator means comprises:

a transformer having a primary and a secondary, the primary connected in circuit with the modulator; and means for coupling the video data signal to the secondary where it is algebraically added to the modulated signal to form a multiplexed signal.

5. The subject matter of claim 2 together with control circuitry comprising:

timing chain means connected in circuit with a phase lock loop for counting in a frequency stablized manner;

means for generating a signal when a valid data character has been transmitted or received by the terminal;

character address counter means connected to the signal generating means for incrementing its count in response to generated data valid signals;

line address counter means having its input connected to circuit with the character address counter means for incrementing its count in response to the filling up of a data line with processed characters;

means for connecting the outputs of the character and line address counter means to form a combined count;

means for comparing the combined count with a count from the timing chain means and producing a comparison signal when an identity of counts exists therebetween;

gate means for detecting coincidence between a comparison signal and a data valid signal;

means connecting the output of the gate means to the first memory means for changing the mode of operation of the first memory means from recirculating to loading of data characters;

load-recirculate means driven by the timing chain means and having an output connected to the second memory means for changing the mode of operation of the second memory means from recirculating to the loading thereof of a line of data characters from the first memory means;

a high frequency clock line connected between the timing chain and the second memory means for reading out the characters stored therein to the character generating means; and means connected between the timing chain means and the character generator means for sequentially producing display trace signals for each row of the dot matrix of a character being fed to the character generator means by the second memory means.

6. The subject matter set forth in claim 5 wherein the modulator means comprises parallel connected diode and capacitor components connected to the output of the R.F. oscillator means.

7. The structure as defined in claim 5 wherein the means for algebraically adding the video data signal to the modulator means comprises:

a transformer having a primary and a secondary, the primary connected in circuit with the modulator; and means for coupling the video data signal to the secondary where it is algebraically added to the modulated signal to form a multiplexed signal.

8. The structure set forth in claim 7, and further wherein the modulator means comprises parallel connected diode and capacitor components connected to the output of the R.F. oscillator means.

* * * * *